United States Patent
Branson et al.

(10) Patent No.: US 9,651,268 B2
(45) Date of Patent: May 16, 2017

(54) GAS FIRED MODULAR BLOWER CONTROL AND ASSOCIATED METHODOLOGY

(71) Applicant: Rheem Manufacturing Company, Atlanta, GA (US)

(72) Inventors: Michael W. Branson, Noblesville, IN (US); Kelvin W. Kleman, Fort Smith, AR (US); Timothy B. Hawkins, Fort Smith, AR (US); Diane M. Jakobs, Alma, AR (US)

(73) Assignee: RHEEM MANUFACTURING COMPANY, Atlanta, GA (US)

(*) Notice: Subject to any disclaimer, the term of this patent is extended or adjusted under 35 U.S.C. 154(b) by 490 days.

(21) Appl. No.: 14/200,938

(22) Filed: Mar. 7, 2014

(65) Prior Publication Data
US 2014/0252100 A1    Sep. 11, 2014

Related U.S. Application Data

(60) Provisional application No. 61/775,916, filed on Mar. 11, 2013.

(51) Int. Cl.
*F24D 5/12*    (2006.01)
*F24D 19/10*    (2006.01)

(52) U.S. Cl.
CPC .......... *F24D 19/1087* (2013.01); *F24D 5/12* (2013.01); *F24D 2200/04* (2013.01); *F24D 2200/12* (2013.01); *F24F 2221/34* (2013.01)

(58) Field of Classification Search
CPC .... F24D 19/1087; F24D 5/12; F24D 2200/12; F24D 2200/04; F24F 2221/34
USPC .................. 237/2 B, 2 A, 81; 236/1 C, 91 D
IPC ................................................. F24D 5/12,19/10
See application file for complete search history.

(56) References Cited

U.S. PATENT DOCUMENTS

| | | | |
|---|---|---|---|
| 4,112,705 A | 9/1978 | Sisk et al. | |
| 4,191,023 A | 3/1980 | Sisk et al. | |
| 4,311,192 A | 1/1982 | VanderVaart | |
| 4,389,853 A * | 6/1983 | Hile | F24F 11/0009 165/251 |
| 4,399,862 A * | 8/1983 | Hile | F24F 11/0009 165/253 |
| 4,918,933 A | 4/1990 | Dyer | |
| 5,522,234 A | 6/1996 | Yoo et al. | |
| 5,788,149 A * | 8/1998 | Schwarz | F16K 11/074 237/2 B |
| 5,918,668 A | 7/1999 | Trimble | |
| 6,289,685 B1 | 9/2001 | Utsumi et al. | |

(Continued)

*Primary Examiner* — Gregory Huson
*Assistant Examiner* — Daniel E Namay
(74) *Attorney, Agent, or Firm* — King & Spalding LLP

(57) ABSTRACT

An air heating and cooling system includes (1) a heat pump, illustratively devoid of auxiliary electric resistance type air heating structure, operative to provide refrigerant-based heating or cooling of air being delivered to a conditioned space, (2) a fuel-fired modular blower selectively operable to generate combustion heat, and (3) a control system associated with the heat pump and the modular blower. The control system has a heat pump thermostat electrically connected to a modular blower control and operative to transmit to the modular blower a first signal indicative of heating operation of the heat pump, and a second signal indicative of a need for alternative heat during a heating demand cycle. The modular blower is operative, in response to receiving both signals, to provide combustion-based air heating in place of refrigerant-based heat pump air heating.

21 Claims, 5 Drawing Sheets

(56) References Cited

U.S. PATENT DOCUMENTS

| | | | |
|---|---|---|---|
| 7,380,588 B2 | 6/2008 | Helt | |
| 7,621,140 B2 * | 11/2009 | Schnell | F24D 12/02 236/1 C |
| 7,731,098 B2 | 6/2010 | Butler et al. | |
| 8,224,495 B2 * | 7/2012 | Weaver | F01K 3/16 137/828 |
| 8,245,948 B2 * | 8/2012 | Cho | F25B 27/02 122/1 R |
| 9,513,642 B2 * | 12/2016 | Rogers | G05D 23/1904 |
| 2004/0118933 A1 * | 6/2004 | Readio | F24D 12/02 237/2 B |
| 2005/0194456 A1 * | 9/2005 | Tessier | F24F 11/006 236/51 |
| 2006/0131434 A1 * | 6/2006 | Butler | F24F 11/0012 236/1 C |
| 2007/0012052 A1 * | 1/2007 | Butler | F24F 11/0009 62/181 |
| 2007/0044501 A1 * | 3/2007 | Schnell | F24D 12/02 62/331 |
| 2007/0131784 A1 * | 6/2007 | Garozzo | F24F 11/0009 236/51 |
| 2007/0205298 A1 * | 9/2007 | Harrison | F24D 11/0221 237/2 B |
| 2008/0029610 A1 * | 2/2008 | Nichols | F24F 11/006 236/1 C |
| 2008/0054082 A1 * | 3/2008 | Evans | F24D 12/02 236/91 D |
| 2009/0261174 A1 * | 10/2009 | Butler | F24F 11/006 236/51 |
| 2010/0090017 A1 * | 4/2010 | Naghshineh | F24H 9/2085 237/2 B |
| 2010/0314458 A1 * | 12/2010 | Votaw | F24F 3/001 236/1 B |
| 2012/0043390 A1 * | 2/2012 | Noh | F24D 3/08 237/2 A |

* cited by examiner

GAS FIRED MODULAR BLOWER CONTROL AND ASSOCIATED METHODOLOGY

CROSS-REFERENCE TO RELATED APPLICATION

The present application claims the benefit of the filing date of provisional U.S. patent application No. 61/775,916 filed Mar. 11, 2013. The entire disclosure of the provisional application is hereby incorporated herein by this reference.

BACKGROUND OF THE INVENTION

It is known in the space heating art to provide both heating and cooling to a building interior using a reversible circuit electric heat pump that operates to either pump indoor ambient heat out of the building (during the heat pump's cooling cycle) or, with its refrigerant circuit reversed by operation of a reversible valve in the circuit, pump ambient outdoor air heat into the building (during the heat pump's heating cycle). Particularly in cold northern climates, winter temperatures commonly reach low temperatures that make it difficult if not impossible to wring sufficient heat out of the frigid outside air to sufficiently heat the building interior using only the heat pump. Because of this it has been common practice to add to the heat pump auxiliary heating in the form of electric resistance strip heaters that supplement the refrigerant heating capacity of the heat pump when heating conditions warrant.

While this meets the comfort requirements of the building, it also substantially increases the yearly heating bill due the normally much higher cost of electric resistance heating compared to the refrigerant-based heating provided by a heat pump. As an alternate to this resistance heat add-on technique, various proposals have been made to supplement the refrigerant heating capacity of a reversible heat pump with a fuel-fired supplemental heating source used in place of the heat pump during high heating demand periods when the heat pump cannot provide sufficient heat by itself. However, a common shortcoming of such proposals has been their tendency to lessen the overall resulting efficiency of the heat pump/fuel-fired hybrid heating system to an undesirable degree. Accordingly, a need exists for a heat pump/fuel-fired hybrid heating system that strikes a more desirable balance between efficiency and operating costs, while restricting the user from overriding the heat pump. It is to this need that the present invention is primarily directed.

DETAILED DESCRIPTION

Figure 1:
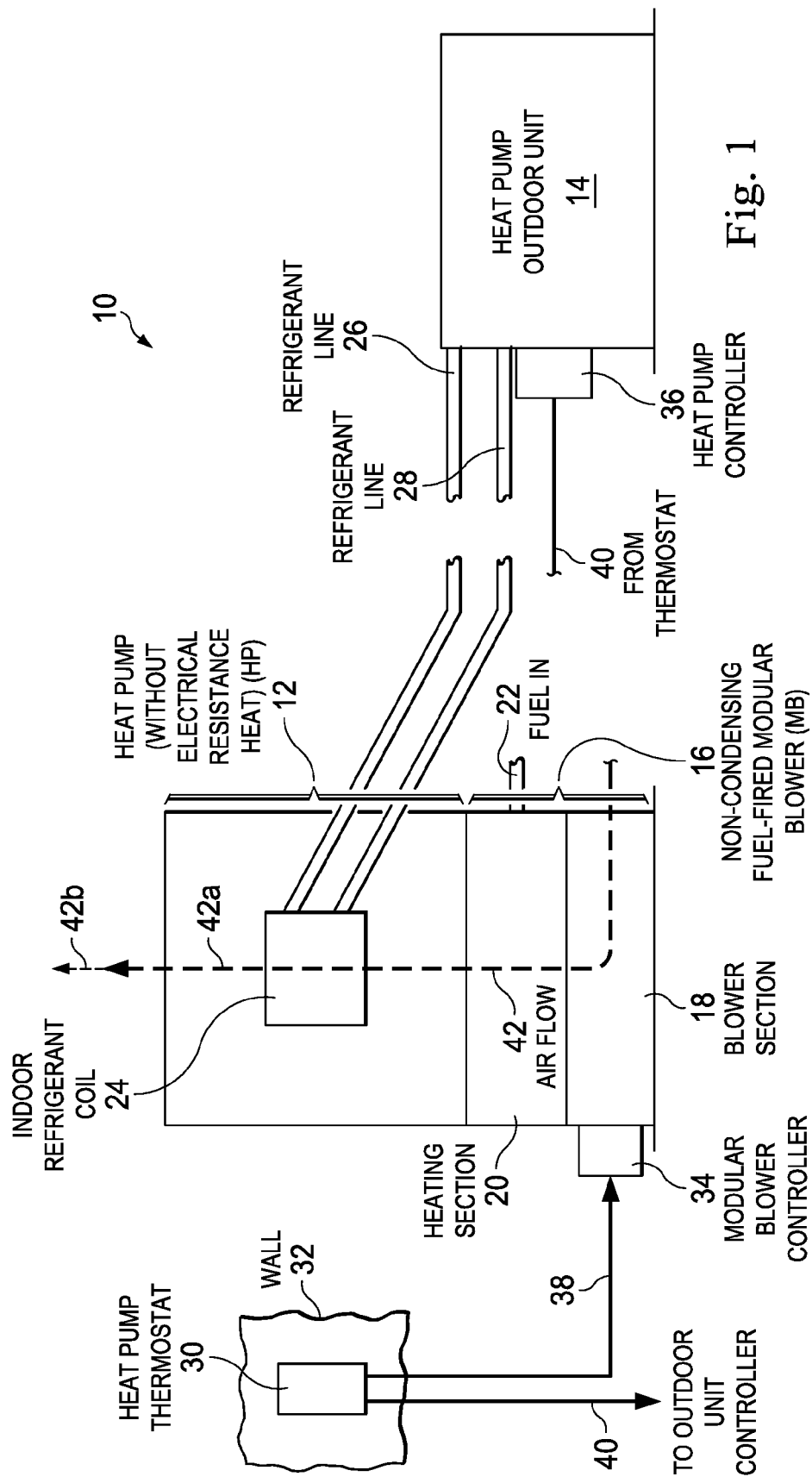
FIG. 1 is a schematic diagram of the components in the heat pump/non-condensing type fuel-fired modular blower system.

Referring initially to FIG. 1, in a representatively illustrated embodiment thereof the present invention provides a specially designed reversible circuit heat pump-based system 10 comprising an indoor heat pump coil unit 12 (representatively, as denoted in FIG. 1, having no electric resistance type of secondary heating structure), an outdoor heat pump unit 14, and a fuel-fired supplemental heating source which is representatively a non-condensing type gas-fired modular blower 16. Illustratively, the indoor heat pump coil unit 12 rests atop the modular blower 16 which has the schematically depicted blower and heating sections 18 and 20, the heating section 20 being supplied with gas (or another type of fuel) via a fuel supply line 22. The indoor heat pump coil unit 12 has an indoor refrigerant coil 24 which, via refrigerant lines 26 and 28, is operatively coupled to an outdoor coil and associated circuit components (not shown) within the outdoor unit 14.

Three control components are associated with the system 10—a heat pump thermostat 30 representatively mounted external to the indoor heat pump unit 12 on a wall 32, a specially designed modified modular blower control 34 representatively associated with the blower section 18 of the modular blower 16, and a heat pump controller 36 representatively mounted on the outdoor heat pump unit 14. The heat pump thermostat 30 is electrically coupled to the modular blower controller 34, as schematically depicted by the numeral 38, and to the heat pump controller 36, as schematically depicted by the numeral 40.

During cooling operation of the heat pump system 10, the blower section 18 of the non-condensing fuel-fired modular blower 16 sequentially flows system return air 42 upwardly through the modular blower heating section 20 (which is unfired during heat pump cooling cycles), and then upwardly across the indoor refrigerant coil 24 which cools the air 42 so that it exits the heat pump 12 as conditioned (i.e., cooled) air 42a. Alternatively, the heat pump coil unit 12 may be a downflow or horizontal unit if desired.

During normal heating operation of the heat pump system 10, the blower section 18 of the non-condensing fuel-fired modular blower 16 sequentially flows system return air 42 upwardly through the unfired modular blower heating section 20, and then upwardly across the indoor refrigerant coil 24 which heats the air 42 so that it exits the indoor heat pump coil unit 12 as conditioned (i.e., heated) air 42b. Using a specially designed overall control technique for the system 10, as subsequently described herein, in a heating cycle thereof the system 10 normally produces the heated discharge air 42b using only the refrigerant heat from the indoor coil 24 but if its heating output is detected as being insufficient to meet a particular heat demand, the overall system control automatically terminates heat pump operation and initiates firing of the modular blower heating section 20 to replace the refrigerant-based heating of the indoor coil 24 with combustion heat and thereby raise the temperature of the heated supply air 42b being discharged from the heat pump 12. When the overall system control detects that the replacement combustion heat from the modular blower heating section 20 is no longer required, such combustion heat is terminated and the heat pump coil unit 12 is re-activated until the heat demand is met by the indoor refrigerant coil 24.

In the depicted representative embodiment of the present invention, the use of a non-condensing gas-fired modular blower 16 as an alternative to electric resistive elements for back-up heat is uniquely coupled with the specially designed modified modular blower control 34 in a manner assuring that the modular blower 16 is only utilized for secondary heat when the heat pump portion 12,14 of the system 10 cannot provide adequate heat (e.g., at extremely low outdoor ambient temperature conditions or if the heat pump portion 12,14 has failed).

Figure 2:
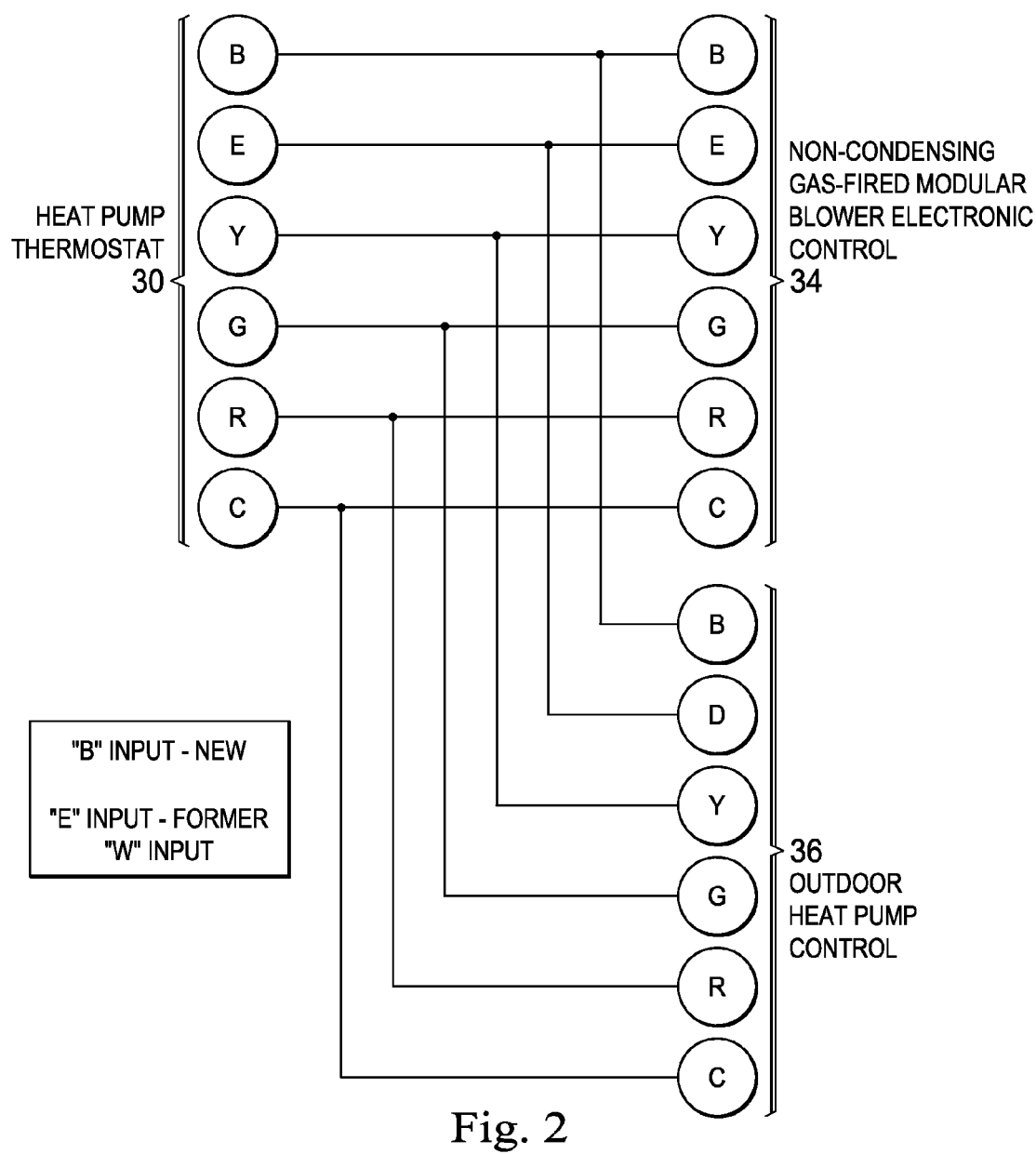
FIG. 2 is a simplified schematic wiring diagram for the FIG. 1 system.

A simplified wiring diagram for the system 10 is shown in FIG. 2 and indicates the arrangement of the connection terminals, and the electrical wires interconnecting them, for the heat pump (HP) thermostat 30, the modified non-condensing gas-fired modular blower (MB) electronic control 36, and the outdoor heat pump (HP) control 36.

With the following exceptions relating to the modular blower control 34, the thermostat 30 and the controls 34 and 36 may be of conventional construction and configurations. First, the modified modular blower control 34 is provided with a new connection terminal "B" that indicates when a call for heat pump heating operation is requested from the heat pump thermostat 30 (via its connection terminal "B"), for example, when the heat pump reversing valve has been switched to its heating orientation. Second, the modified modular blower control 34 is provided with a new input connection terminal "E" indicating when a call for secondary heat operation is requested from the heat pump thermostat 30 (via its connection terminal "E"), such request being indicative of a call for emergency heat during a heat pump heating cycle. The new terminal "E" of the modular blower control 34 may be the former "W" input terminal from a conventional control used in a non-condensing gas furnace. Third, the software algorithms in the modular blower control 34 are modified to prevent utilization of the non-condensing gas-fired modular blower 16 except under secondary conditions (i.e., when the "E" input to the modular blower control 34 is active).

Figure 3:
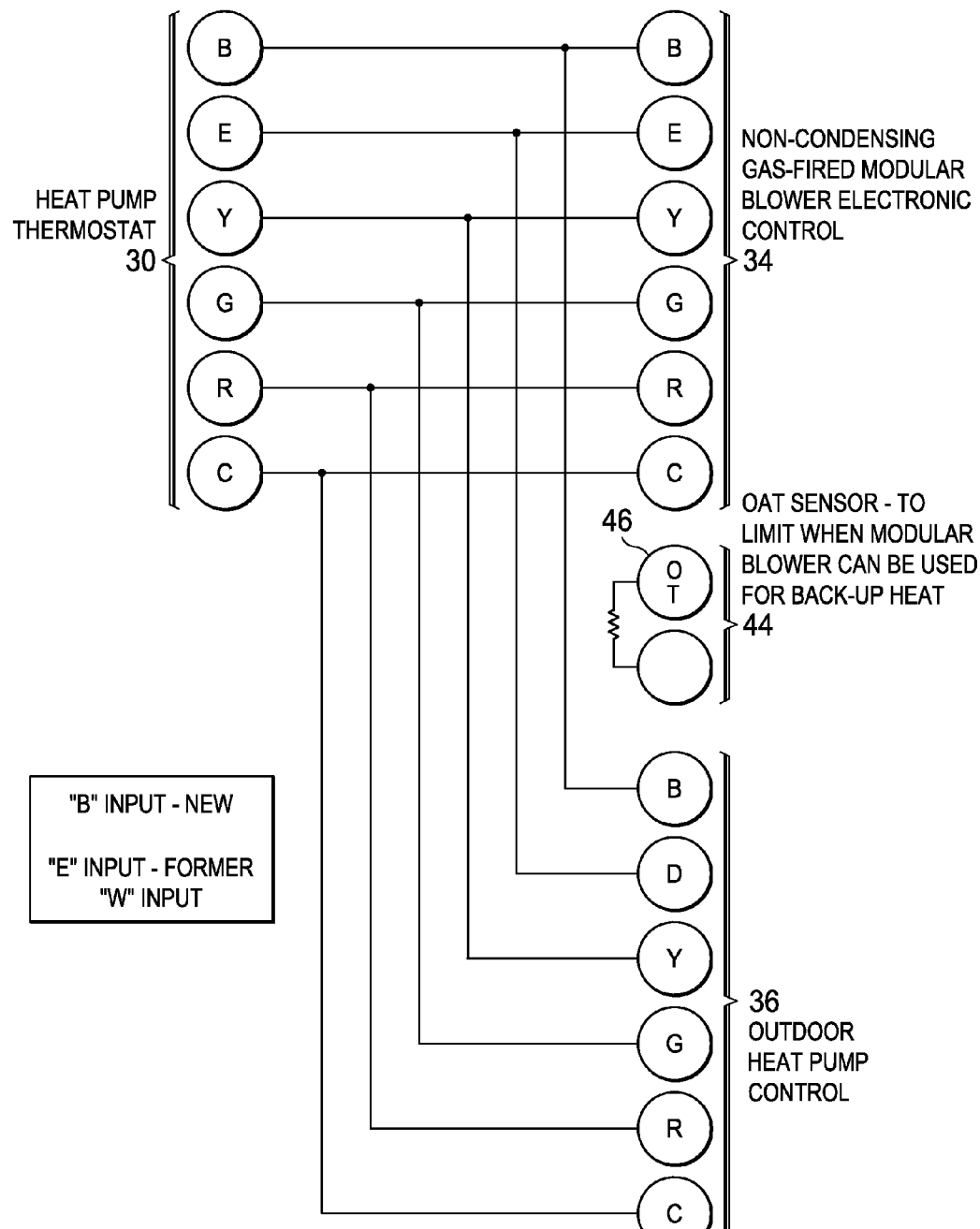
FIG. 3 is an alternate embodiment of the FIG. 2 simplified schematic wiring diagram.

An alternate embodiment of the FIG. 2 simplified control wiring diagram is depicted in FIG. 3. The FIG. 3 wiring diagram is identical to the FIG. 2 wiring diagram with the exception that in the FIG. 3 electrical wiring circuit an outside air temperature lockout portion 44 is incorporated therein. The lockout portion 44 has an outside air temperature (OAT) sensor portion 46 and functions to limit when the modular blower (MB) 16 can be used for back-up heat.

Figure 4:
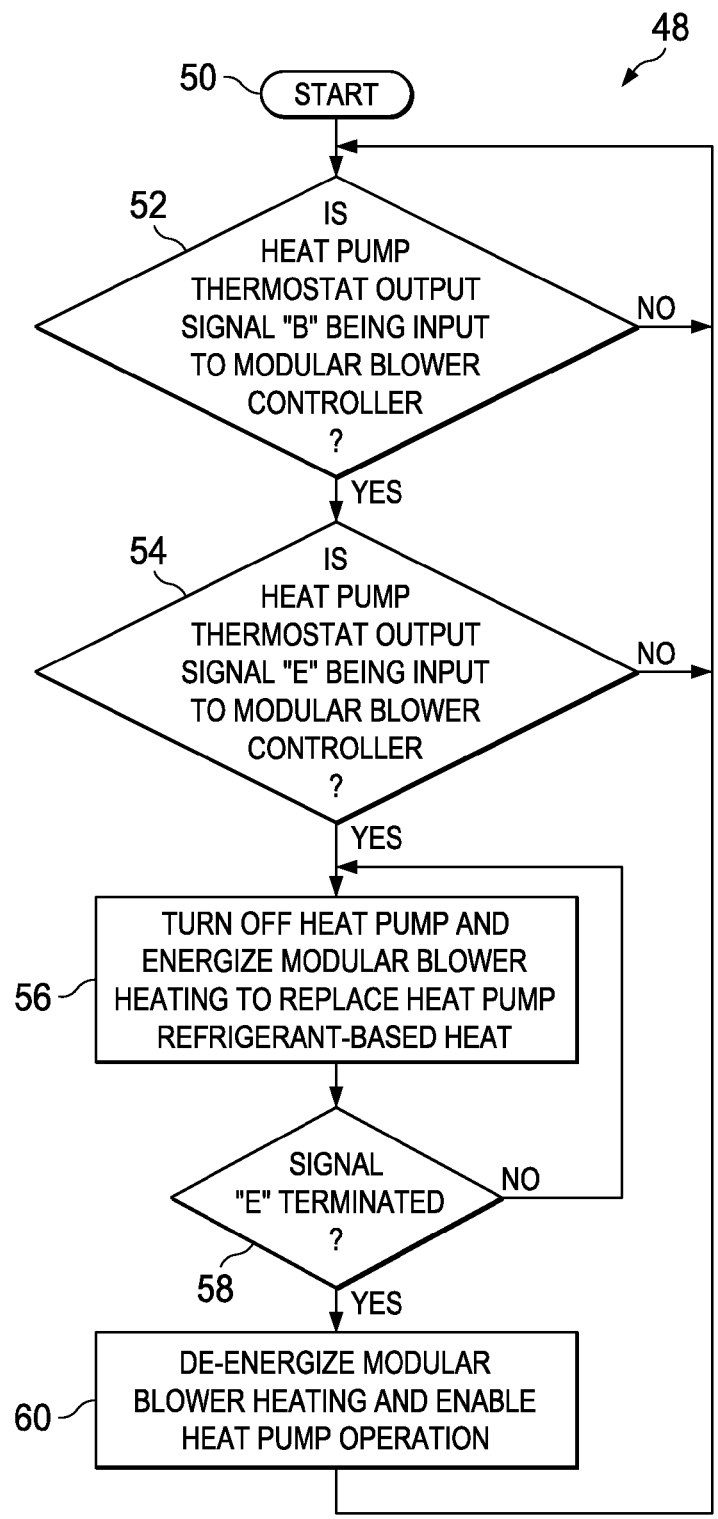
FIG. 4 is a control logic flow chart for the modified fuel-fired modular blower control portion of the FIG. 1 system.

A logic flow diagram 48 is shown in FIG. 4 and illustrates the operation of the modified modular blower control 34 in controlling the use of combustion heat from the modular blower 16 to replace the refrigerant-based heat provided by the heat pump portions 12,14 (see FIG. 1) during a space heating demand cycle. Subsequent to a suitable starting step 50, a query is made at step 52 as to whether a heat pump thermostat output signal "B" is being input to the modular blower control 34. If it is not, the system loops back to step 52. If the step 52 query answer is "yes" a transfer is made from step 52 to step 54 at which a query is made as to whether the heat pump thermostat output signal "E" is being input to the modular blower control 34. If it is not, the system loops back to step 52. If the step 54 query answer is "yes", a transfer is made from step 54 to step 56.

At step 56 the heat pump is turned off and the modular blower heating section 20 (see FIG. 1) is energized to replace the refrigerant-based heat previously being generated by the now idle heat pump indoor refrigerant coil 24 (see FIG. 1). A transfer is then made from step 56 to step 58 at which a query is made as to whether the signal "E" transmitted to the modular blower control 34 has terminated. If it has not, the system loops through steps 56 and 58, continuing to provide replacement combustion heat from the modular blower until the answer to the step 58 query becomes "yes". When this occurs, a transfer is made from step 58 to step 60 at which the heating of the modular blower section 20 is terminated, heat pump operation is re-enabled, and a transfer is made from 60 back to step 52.

Figure 5:
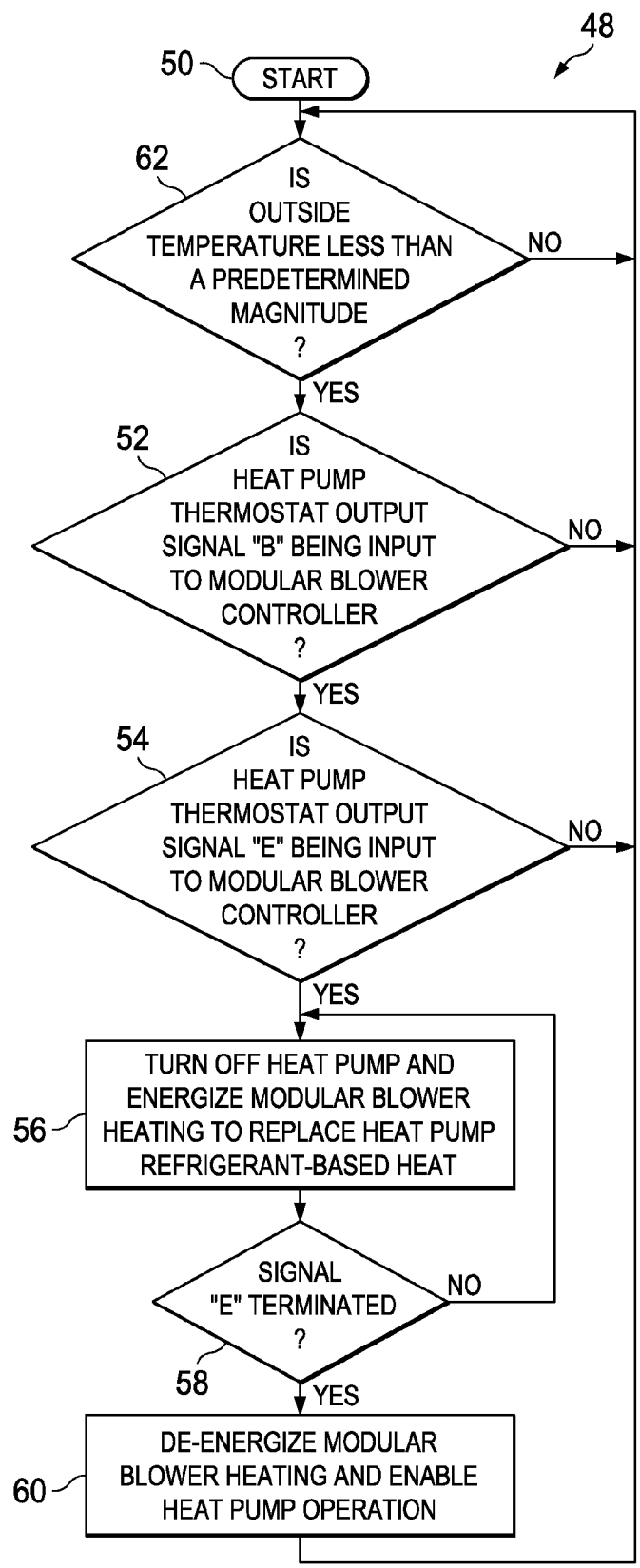
FIG. 5 is an alternate control logic flow chart portion which may be added to the FIG. 4 flow chart.

When the previously described outside air temperature lockout circuit portion 44 (see FIG. 3) is utilized, the FIG. 4 logic flow diagram is modified, as shown in FIG. 5, by interposing an additional step 62 between the previously described steps 50 and 52. At the additional step 62 shown in FIG. 5, a query is made as to whether the outside ambient temperature is less than a predetermined magnitude. If it is not, the system pauses at step 62 until the query answer becomes "yes" at which point a transfer is made from the additional step 62 to the previously described step 52 in the logic flow diagram of FIG. 4.

As can be seen from the foregoing, in an illustrated representative embodiment of the present invention, combustion heat from a fuel-fired modular blower, preferably a non-condensing type fuel-fired modular blower, is used to replace the refrigerant-based heating capacity of a reversible circuit heat pump only when the heat pump refrigerant heat is insufficient to meet a heat pump heating demand as evidenced by the receipt by a modular blower control from a heat pump thermostat of both a first signal indicative of a call for heat pump heat (by, for example, the heat pump reversing valve having been set to its heating orientation), and a second signal indicative of a call for emergency heat during a heat pump heating cycle. Additionally, this is done in a manner desirably restricting the user from overriding the heat pump.

The foregoing detailed description is to be clearly understood as being given by way of illustration and example only, the spirit and scope of the present invention being limited solely by the appended claims.

What is claimed is:

1. A heat pump system comprising:
 a reversible refrigerant circuit heat pump operable in heating and cooling modes to selectively heat or cool air being delivered to a conditioned space;
 a fuel-fired modular blower selectively operable to generate combustion heat; and
 a control system associated with said heat pump and said modular blower and having a heat pump thermostat electrically connected to a modular blower control, said heat pump thermostat being operative to transmit to said modular blower control (1) a first signal indicative of heating operation of said heat pump, and (2) a second signal indicative of a need for alternative heat during a heating demand cycle, and said modular blower control being operative, in response to receipt of both of said first and second signals, to cause said fuel-fired modular blower to generate combustion heat in place of refrigerant-based air heating of said heat pump; wherein said modular blower control, in response to receipt of both of said first and second signals, is operative to cause said fuel-fired modular blower to generate said combustion heat to replace refrigerant-based air heating of said heat pump during heating operation thereof, unless the outside ambient temperature is not less than a predetermined temperature.

2. The heat pump system of claim 1 wherein:
 said fuel-fired modular blower is a non-condensing fuel-fired modular blower.

3. The heat pump system of claim 2 wherein:
 said non-condensing fuel-fired modular blower is a non-condensing gas-fired modular blower.

4. The heat pump system of claim 1 wherein:
said heat pump has an indoor heat pump coil unit with an indoor refrigerant coil therein, and
said fuel-fired modular blower is operative to discharge air therefrom that flows across said indoor refrigerant coil.

5. The heat pump system of claim 4 wherein:
said indoor heat pump coil unit rests atop said fuel-fired modular blower.

6. The heat pump system of claim 1 wherein:
said reversible refrigerant heat pump has an indoor heat pump coil unit and an outdoor unit,
said heat pump thermostat is remotely located indoors from said indoor heat pump coil unit,
said modular blower control is carried by said fuel-fired modular blower, and
said outdoor unit has a heat pump control mounted thereon and electrically coupled to said heat pump thermostat and said modular blower control.

7. The heat pump system of claim 6 wherein:
said fuel-fired modular blower has a blower section and a heating section, and
said modular blower controller is carried by said blower section.

8. The heat pump system of claim 1 wherein:
said heat pump has a refrigerant circuit with a reversing valve therein, and
said first signal is indicative of said reversing valve having been switched to its heating orientation in said refrigerant circuit.

9. The heat pump system of claim 1, comprising a heat pump controller in communication with the heat pump thermostat, the heat pump controller being configured to communicate a control signal to the heat pump thermostat indicative of the heating operation of the heat pump.

10. The heat pump system of claim 9, wherein the heat pump thermostat is configured to communicate the control signal received from the heat pump controller to the modular blower control as the first signal.

11. A heating method comprising the steps of:
providing a reversible refrigerant circuit heat pump having a heat pump thermostat operatively associated therewith;
providing a fuel-fired modular blower having a modular blower control associated therewith;
transmitting to said modular blower control from said heat pump thermostat first and second signals respectively indicative of heating operation of said heat pump, and a need of said heat pump for supplemental heating during said heating operation thereof; and,
in response to said modular blower control receiving both of said first and second signals, and only during heating operation of said heat pump, causing said modular blower control to operate said fuel-fired modular blower in a manner replacing refrigerant heat created by said heat pump with combustion heat created by said fuel-fired modular blower; wherein said causing step is performed unless the outdoor ambient temperature is not less than a predetermined temperature.

12. The heating method of claim 11 wherein:
said step of providing a fuel-fired modular blower is performed by providing a non-condensing fuel-fired modular blower.

13. A system for selectively heating or cooling air being delivered to a conditioned space, comprising:

a heat pump having a reversible refrigerant circuit and being devoid of electrical resistance type air heating structure;
a heat pump control associated with the heat pump and providing control signals to the heat pump;
a fuel-fired supplemental heating source selectively operable to generate combustion heat;
a modular supplemental heating source control associated with the fuel fired supplemental heating source and providing control signals to the fuel fired supplemental heating source; and
a control system including both the heat pump control and the modular supplemental heating source control for automatically terminating refrigerant-based heat pump air heating, and replacing it with combustion-based air heating by said fuel-fired supplemental heating source, in response to the modular supplemental heating source control receiving signals indicative of both (1) heating operation of said heat pump, and (2) an inability of said refrigerant-based air heating of said heat pump to sufficiently heat air being delivered to the conditioned space; wherein said control system is operative to replace refrigerant-based air heating by said heat pump with combustion-based air heating by said fuel-fired supplemental heating source only if the outside ambient temperature is at or above a predetermined temperature.

14. The system of claim 13 wherein:
said fuel-fired supplemental heating source is a fuel-fired modular blower.

15. The system of claim 14 wherein:
said fuel-fired modular blower is a non-condensing fuel-fired modular blower.

16. The system of claim 15 wherein:
said non-condensing fuel-fired modular blower is a non-condensing gas-fired modular blower.

17. The system of claim 13 wherein:
said heat pump has a reversing valve in said reversible refrigerant circuit, and
said detecting by said control system of heating operation of said heat pump is performed by detecting that said reversing valve has been switched to its heating orientation in said reversible refrigerant circuit.

18. An air heating method comprising the steps of:
providing a reversible refrigerant circuit heat pump devoid of electrical resistance type air heating structure and operative to utilize refrigerant-based heat to heat air operatively flowing through said heat pump, the heat pump including a heat pump control;
providing a fuel-fired supplemental heating source operative to generate combustion heat, the supplemental heating source including a modular supplemental heating source control; receiving at the modular supplemental heating source control signals indicative of both (1) heating operation of said heat pump, and (2) an inability of said refrigerant-based air heating of said heat pump to sufficiently heat air being delivered to the conditioned space; and
terminating refrigerant-based heat pump air heating, and replacing it with combustion-based air heating by said fuel-fired supplemental heating source, in response to a sensed inability of said refrigerant-based heat of said heat pump to sufficiently heat air operatively flowing through said heat pump during a heating demand cycle thereof; wherein said terminating step is performable only during periods when the outdoor ambient temperature is not less than a predetermined temperature.

19. The air heating method of claim 18 wherein:
said step of providing a fuel-fired supplemental heating source is performed by providing a fuel-fired modular blower.

20. The air heating method of claim 19 wherein:
said step of providing a fuel-fired modular blower is performed by providing a non-condensing type fuel-fired modular blower.

21. The air heating method of claim 20 wherein:
said step of providing a non-condensing type fuel-fired modular blower is performed by providing a non-condensing type gas-fired modular blower.

\* \* \* \* \*